US012716560B2

(12) United States Patent
Jones et al.

(10) Patent No.: US 12,716,560 B2
(45) Date of Patent: Aug. 25, 2026

(54) FLAME SIMULATING ASSEMBLY WITH A REFLECTIVE LIGHT SYSTEM AND A CLEAR SPECULAR REFLECTIVE PANEL

(71) Applicant: Living Style (B.V.I.) Limited, Tortola (VG)

(72) Inventors: Paul Jones, San Diego, CA (US); Willard Lassen, San Diego, CA (US)

(73) Assignee: Living Style (B.V.I.) Limited, Tortola (VG)

(*) Notice: Subject to any disclaimer, the term of this patent is extended or adjusted under 35 U.S.C. 154(b) by 0 days.

(21) Appl. No.: 18/919,800

(22) Filed: Oct. 18, 2024

(65) Prior Publication Data

US 2025/0129907 A1 Apr. 24, 2025

Related U.S. Application Data

(60) Provisional application No. 63/592,024, filed on Oct. 20, 2023.

(51) Int. Cl.

| | |
|---|---|
| ***F21S 10/04*** | (2006.01) |
| ***F21V 7/05*** | (2006.01) |
| ***F21V 11/00*** | (2015.01) |
| *F21Y 113/13* | (2016.01) |

(52) U.S. Cl.
CPC .............. *F21S 10/046* (2013.01); *F21V 7/05* (2013.01); *F21V 11/00* (2013.01); *F21Y 2113/13* (2016.08)

(58) Field of Classification Search
CPC ..................................................... F21S 10/046
See application file for complete search history.

(56) References Cited

U.S. PATENT DOCUMENTS

| | | | |
|---|---|---|---|
| 3,978,598 | A | 9/1976 | Rose et al. |
| 4,026,544 | A | 5/1977 | Plambeck et al. |
| 4,203,241 | A | 5/1980 | Wallace |
| 4,272,908 | A | 6/1981 | Bassetti et al. |
| 4,296,154 | A | 10/1981 | Ibberson |
| 4,726,351 | A | 2/1988 | Whittaker et al. |
| 4,897,524 | A | 1/1990 | Brasell |

(Continued)

FOREIGN PATENT DOCUMENTS

| | | |
|---|---|---|
| CN | 1661281 A | 8/2005 |
| CN | 2924710 Y | 7/2007 |

(Continued)

*Primary Examiner* — Sean P Gramling
(74) *Attorney, Agent, or Firm* — Hinckley Allen & Snyder; Stephen Holmes

(57) ABSTRACT

A novel gas flame simulating assembly includes a fire media bed, a rear projection lighting system for flame effect on a rear imaging wall and a clear specular reflective panel which is clear enough to allow the viewer to see through it to see the flame simulation on the rear imaging wall, but reflective enough to specularly reflect the fire media bed to increase the perceived depth of the fire media bed and allow the flame effect to appear to arise up through the middle of the reflected media bed. The assembly may further include a forward lighting system to illuminate the underside of the fire media bed and an internal light shield which compartmentalizes the front and rear lighting systems so that the lighting colors do not bleed into one another. This flame simulating assembly may be utilized in fully assembled insert constructions or ready to assembly insert constructions.

19 Claims, 13 Drawing Sheets

(56) References Cited

U.S. PATENT DOCUMENTS

| | | | |
|---|---|---|---|
| 4,965,707 | A | 10/1990 | Butterfield |
| 5,003,158 | A | 3/1991 | Erkki |
| 5,099,591 | A | 3/1992 | Eiklor et al. |
| 5,195,820 | A | 3/1993 | Rehberg |
| 5,635,898 | A | 6/1997 | Walters et al. |
| 5,642,580 | A | 7/1997 | Hess et al. |
| 5,774,040 | A | 6/1998 | Lastoria |
| 5,826,357 | A | 10/1998 | Hechler |
| 5,887,369 | A | 3/1999 | Danielczak |
| 5,980,059 | A | 11/1999 | Chi |
| 5,989,128 | A | 11/1999 | Baker et al. |
| 6,047,489 | A | 4/2000 | Hess et al. |
| 6,050,011 | A | 4/2000 | Hess et al. |
| 6,053,165 | A | 4/2000 | Butler et al. |
| 6,082,868 | A | 7/2000 | Carpenter |
| 6,135,604 | A | 10/2000 | Lin |
| 6,152,728 | A | 11/2000 | Griffel |
| 6,155,837 | A | 12/2000 | Korneliussen |
| 6,162,047 | A | 12/2000 | Hess |
| 6,190,019 | B1 | 2/2001 | Hess |
| 6,269,567 | B1 | 8/2001 | MacPherson et al. |
| 6,302,555 | B1 | 10/2001 | Bristow |
| 6,312,137 | B1 | 11/2001 | Hsich |
| 6,350,498 | B1 | 2/2002 | Hess et al. |
| 6,363,636 | B1 | 4/2002 | Hess et al. |
| 6,385,881 | B1 | 5/2002 | Hess |
| 6,393,207 | B1 | 5/2002 | Martin et al. |
| 6,454,425 | B1 | 9/2002 | Lin |
| 6,461,011 | B1 | 10/2002 | Harrison |
| 6,554,443 | B2 | 4/2003 | Fan |
| 6,564,485 | B1 | 5/2003 | Hess |
| 6,615,519 | B2 | 9/2003 | Hess |
| 6,685,574 | B2 | 2/2004 | Hall |
| 6,691,440 | B1 | 2/2004 | Petz et al. |
| 6,718,665 | B2 | 4/2004 | Hess et al. |
| 6,757,487 | B2 | 6/2004 | Martin et al. |
| 6,758,575 | B2 | 7/2004 | Winkler |
| 6,802,782 | B2 | 10/2004 | Hall et al. |
| 6,880,275 | B2 | 4/2005 | Mix et al. |
| 6,919,884 | B2 | 7/2005 | Mix et al. |
| 6,944,982 | B2 | 9/2005 | Schroeter et al. |
| 6,953,401 | B2 | 10/2005 | Starr |
| 6,955,440 | B2 | 10/2005 | Niskanen |
| 6,966,665 | B2 | 11/2005 | Limburg et al. |
| 6,968,123 | B2 | 11/2005 | Ravnbo-West et al. |
| 7,080,472 | B2 | 7/2006 | Schroeter et al. |
| 7,093,949 | B2 | 8/2006 | Hart et al. |
| 7,111,421 | B2 | 9/2006 | Corry et al. |
| 7,134,229 | B2 | 11/2006 | Hess et al. |
| 7,162,820 | B2 | 1/2007 | Hess et al. |
| 7,194,830 | B2 | 3/2007 | Hess |
| 7,219,456 | B1 | 5/2007 | Wei et al. |
| 7,234,255 | B2 | 6/2007 | Peng et al. |
| 7,236,693 | B2 | 6/2007 | Haugom |
| 7,281,811 | B2 | 10/2007 | Thuot Rann et al. |
| 7,300,179 | B1 | 11/2007 | LaDuke et al. |
| 7,305,783 | B2 | 12/2007 | Mix et al. |
| 7,322,136 | B2 | 1/2008 | Chen |
| 7,322,819 | B2 | 1/2008 | Lyons et al. |
| 7,334,360 | B1 | 2/2008 | Corry |
| 7,373,743 | B1 | 5/2008 | Hess |
| 7,481,571 | B2 | 1/2009 | Bistritzky et al. |
| 7,556,408 | B2 | 7/2009 | Thomson |
| 7,668,442 | B2 | 2/2010 | O'Neill |
| 7,670,035 | B2 | 3/2010 | Tsai |
| 7,673,408 | B2 | 3/2010 | Hess et al. |
| 7,686,471 | B2 | 3/2010 | Reichow |
| 7,726,300 | B2 | 6/2010 | Lyons et al. |
| 7,744,232 | B2 | 6/2010 | Gruenbacher et al. |
| 7,762,897 | B2 | 7/2010 | Starr et al. |
| 7,770,312 | B2 | 8/2010 | Stinson et al. |
| 7,775,457 | B2 | 8/2010 | Schnuckle |
| 7,784,959 | B2 | 8/2010 | Yang |
| 7,798,673 | B2 | 9/2010 | Yang |
| 7,815,328 | B2 | 10/2010 | Van Dyn Hoven |
| 7,824,051 | B2 | 11/2010 | Walter et al. |
| 7,826,727 | B2 | 11/2010 | Bourne |
| 7,850,533 | B2 | 12/2010 | Osterman et al. |
| 7,921,585 | B2 | 4/2011 | Wei et al. |
| 7,967,690 | B2 | 6/2011 | O'Neill |
| 8,019,207 | B2 | 9/2011 | Zhou |
| 8,024,877 | B2 | 9/2011 | Zhu |
| 8,081,872 | B2 | 12/2011 | Wang |
| 8,136,276 | B2 | 3/2012 | O'Neill |
| 8,151,498 | B2 | 4/2012 | Zhu |
| 8,157,425 | B2 | 4/2012 | Gutstein et al. |
| 8,166,687 | B2 | 5/2012 | Zhu |
| 8,230,626 | B2 | 7/2012 | Abileah et al. |
| 8,234,803 | B2 | 8/2012 | Gallo et al. |
| 8,250,792 | B2 | 8/2012 | Zhu |
| 8,356,435 | B2 | 1/2013 | Chen |
| 8,361,367 | B2 | 1/2013 | Hess et al. |
| 8,412,028 | B2 | 4/2013 | Zhu |
| 8,413,358 | B2 | 4/2013 | Betz et al. |
| 8,480,937 | B2 | 7/2013 | Hess et al. |
| 8,523,692 | B2 | 9/2013 | Osterman et al. |
| 8,574,086 | B2 | 11/2013 | O'Neill |
| 8,579,453 | B1 | 11/2013 | Cohen et al. |
| 8,628,223 | B2 | 1/2014 | Kwok et al. |
| 8,641,214 | B1 | 2/2014 | Batchko |
| 8,661,721 | B2 | 3/2014 | Hess et al. |
| 8,671,600 | B2 | 3/2014 | Lu |
| 8,695,247 | B1 | 4/2014 | Yang |
| 8,713,825 | B2 | 5/2014 | Lu |
| 8,739,439 | B2 | 6/2014 | Asofsky et al. |
| 8,763,926 | B2 | 7/2014 | Powell et al. |
| 8,783,888 | B2 | 7/2014 | McCavit et al. |
| 8,904,680 | B1 | 12/2014 | Trovillion |
| 8,904,681 | B2 | 12/2014 | Pan |
| 9,459,010 | B2 | 10/2016 | Asofsky et al. |
| 9,476,596 | B2 | 10/2016 | Asofsky et al. |
| 10,371,333 | B2 | 8/2019 | Jones et al. |
| 10,634,359 | B2 | 4/2020 | Birnbaum |
| 10,731,810 | B2 | 8/2020 | Jones et al. |
| 11,519,576 | B2 | 12/2022 | Lassen |
| 2002/0023376 | A1 | 2/2002 | Hess |
| 2002/0095832 | A1 | 7/2002 | Hess et al. |
| 2002/0139021 | A1 | 10/2002 | Hess et al. |
| 2002/0152655 | A1 | 10/2002 | Merrill et al. |
| 2002/0166554 | A1 | 11/2002 | Berg |
| 2002/0168182 | A1 | 11/2002 | Martin et al. |
| 2002/0174579 | A1 | 11/2002 | Corry et al. |
| 2003/0041491 | A1 | 3/2003 | Mix |
| 2003/0046837 | A1 | 3/2003 | Hess |
| 2003/0049024 | A1 | 3/2003 | Chen |
| 2003/0053305 | A1 | 3/2003 | Lin |
| 2003/0110671 | A1 | 6/2003 | Hess |
| 2003/0156828 | A1 | 8/2003 | Jamieson et al. |
| 2004/0060554 | A1 | 4/2004 | Schlosser et al. |
| 2004/0114351 | A1 | 6/2004 | Stokes et al. |
| 2004/0165374 | A1 | 8/2004 | Robinson |
| 2004/0181983 | A1 | 9/2004 | Hess et al. |
| 2004/0264169 | A1 | 12/2004 | Limburg et al. |
| 2004/0264949 | A1 | 12/2004 | Deng |
| 2005/0063685 | A1 | 3/2005 | Bristow |
| 2005/0097792 | A1 | 5/2005 | Naden |
| 2005/0097793 | A1 | 5/2005 | Hess |
| 2005/0207155 | A1 | 9/2005 | Jian |
| 2006/0002102 | A1 | 1/2006 | Leonard |
| 2006/0101681 | A1 | 5/2006 | Hess et al. |
| 2006/0162198 | A1 | 7/2006 | Hess et al. |
| 2006/0188831 | A1 | 8/2006 | Hess et al. |
| 2006/0230656 | A1 | 10/2006 | Spengler |
| 2006/0242870 | A1 | 11/2006 | Atemboski et al. |
| 2007/0053174 | A1 | 3/2007 | Lin |
| 2007/0175074 | A1 | 8/2007 | O'Neill |
| 2007/0224561 | A1 | 9/2007 | Hess et al. |
| 2008/0004124 | A1 | 1/2008 | O'Neill |
| 2008/0013931 | A1 | 1/2008 | Bourne |
| 2008/0037254 | A1 | 2/2008 | O'Neill |
| 2008/0138050 | A1 | 6/2008 | Moreland et al. |
| 2008/0181587 | A1 | 7/2008 | Patil et al. |
| 2008/0181588 | A1 | 7/2008 | Gorby |
| 2008/0216366 | A1 | 9/2008 | Purton et al. |

(56) References Cited

U.S. PATENT DOCUMENTS

| | | | |
|---|---|---|---|
| 2008/0216818 | A1 | 9/2008 | Rumens et al. |
| 2008/0226268 | A1 | 9/2008 | O'Neill et al. |
| 2009/0071047 | A1 | 3/2009 | O'Neill |
| 2009/0074390 | A1 | 3/2009 | Power et al. |
| 2009/0080871 | A1 | 3/2009 | Chiu |
| 2009/0126241 | A1 | 5/2009 | Asofsky |
| 2009/0313866 | A1 | 12/2009 | Wang |
| 2010/0031543 | A1 | 2/2010 | Rice et al. |
| 2010/0122480 | A1 | 5/2010 | O'Neill |
| 2010/0162600 | A1 | 7/2010 | Betz et al. |
| 2010/0229849 | A1 | 9/2010 | Asofsky et al. |
| 2010/0307040 | A1 | 12/2010 | O'Neill |
| 2011/0080261 | A1 | 4/2011 | Asofsky et al. |
| 2011/0110073 | A1 | 5/2011 | Schnuckle et al. |
| 2013/0031816 | A1 | 2/2013 | Deng |
| 2013/0139422 | A1 | 6/2013 | Lu et al. |
| 2013/0223043 | A1 | 8/2013 | Ray |
| 2013/0269227 | A1 | 10/2013 | Hess et al. |
| 2014/0044423 | A1 | 2/2014 | Chu |
| 2014/0126182 | A1 | 5/2014 | Doud |
| 2014/0130386 | A1 | 5/2014 | Lu |
| 2014/0140042 | A1 | 5/2014 | Schreiber |
| 2014/0168946 | A1 | 6/2014 | Kaplan |
| 2014/0268652 | A1 | 9/2014 | Li |
| 2014/0305013 | A1 | 10/2014 | Peterson |
| 2014/0313694 | A1 | 10/2014 | Patton et al. |
| 2014/0334129 | A1 | 11/2014 | McCavit et al. |
| 2014/0373406 | A1 | 12/2014 | Flynn et al. |
| 2015/0052791 | A1 | 2/2015 | Lu |
| 2015/0068079 | A1 | 3/2015 | O'Neill |
| 2015/0113840 | A1 | 4/2015 | Yang et al. |
| 2015/0131262 | A1 | 5/2015 | Mabry, Jr. et al. |
| 2015/0253013 | A1 | 9/2015 | Fulkerson |
| 2015/0338086 | A1 | 11/2015 | Patton |
| 2015/0338087 | A1 | 11/2015 | Fang |
| 2015/0338105 | A1 | 11/2015 | Lu |
| 2015/0377492 | A1 | 12/2015 | Tynes |
| 2016/0109081 | A1 | 4/2016 | Thompson et al. |
| 2016/0169528 | A1 | 6/2016 | Lu |
| 2016/0169537 | A1 | 6/2016 | Lu |
| 2016/0195277 | A1 | 7/2016 | Li |
| 2016/0258585 | A1 | 9/2016 | Gallo |
| 2017/0089587 | A1 | 3/2017 | Nemes et al. |
| 2017/0167678 | A1 | 6/2017 | Gallo et al. |
| 2017/0328575 | A1 | 11/2017 | Crowe |
| 2018/0299086 | A1 | 10/2018 | Gallo |
| 2019/0293297 | A1 | 9/2019 | Baird |
| 2021/0404667 | A1 | 12/2021 | Crowe |
| 2025/0020331 | A1* | 1/2025 | Chu ...................... F21S 10/046 |

FOREIGN PATENT DOCUMENTS

| | | | |
|---|---|---|---|
| CN | 201662135 | U | 12/2010 |
| CN | 202521701 | U | 11/2012 |
| CN | 205536076 | U | 8/2016 |
| GB | 2275105 | A | 8/1994 |
| GB | 2402469 | A | 12/2004 |
| GB | 2411228 | A | 8/2005 |

* cited by examiner

FLAME SIMULATING ASSEMBLY WITH A REFLECTIVE LIGHT SYSTEM AND A CLEAR SPECULAR REFLECTIVE PANEL

CROSS-REFERENCE TO RELATED APPLICATIONS

The present application is a non-provisional filing of, and claims the benefit of U.S. Provisional Patent Application No. 63/592,024, filed Oct. 20, 2023.

BACKGROUND

1. Technical Field

The present disclosure relates generally to a flame simulating assembly for a simulated fireplace and more particularly to a flame simulating assembly which is particularly effective for gas fire simulated flame systems.

2. Background of the Related Art

Simulated fireplace inserts are known in the industry and have become extremely popular over the last 5-10 years as technology has improved to provide more realistic visual simulated flame and fire effects. While they often provide a heating unit, they are primarily purchased for the aesthetic appearance of a fire. Both the heating unit and the visual projection components of the simulated fireplace unit require some amount of depth for both function and aesthetic appearance. In this regard, the fireplace inserts are typically manufactured as a sealed box unit and may be shipped with, or without an accompany furniture console into which the insert may be received for display and use.

Additionally, as simulated fireplace products have worked their way into higher volume furniture categories, the closed box construction of the fireplace insert has presented several issues for manufacturers and retailers trying to reduce delivery costs. Most notably, the closed box construction of the insert creates a considerable amount of empty volume within the insert thereby increasing the overall shipping size of the insert and the overall cost of delivery per unit.

SUMMARY OF THE DISCLOSURE

Generally there are two types of simulated firebed assemblies, namely those that simulate a wood fire and thus have a simulated wood ember bed and logs, and those that resemble a gas fire and have either a crystal, crushed glass, stone or a pebble firebed, and sometimes also provided with other aesthetic fire media such as larger stones or rocks, or simulated driftwood. Gas fires are particularly difficult to simulate because of the transparent or translucent nature of the firebed, the fire media, the spacing of the media, and the need to illuminate the firebed from below, and the natural tendency of light to bleed through adjacent structures in the assemblies.

The present disclosure provides as a primary objective a novel flame simulating assembly comprising a fire media bed, a rear projection lighting system for flame effect on a rear imaging wall and a clear specular reflective panel which is clear enough to allow the viewer to see through it to see the flame simulation on the rear imaging wall, but also reflective enough so that it specularly reflects the fire media bed rearwardly to increase the perceived depth of the fire media bed which allows the flame effect to appear to arise up through the middle of the reflected media bed.

Some assemblies may further comprise a forward lighting system to illuminate the underside of the fire media bed and an internal light shield which compartmentalizes the front and rear lighting systems so that the lighting colors do not bleed into one another.

The unique flame simulating assemblies may be utilized in either fully assembled insert constructions or ready to assembly insert constructions.

In some embodiments, the flame simulating assembly may comprise a firebed body having a base or lower tray and upstanding hull walls which define an interior cavity. A transparent/translucent fire media bed or tray is seated on top of a forward portion of the firebed body. The fire media bed is forwardly inclined and extends approximately 80% of the front to rear depth of the firebed body. The fire media bed may be filled with crystal stones, crushed glass or mirror shards, pebbles, river rock, simulated driftwood pieces, or other mixed firebed media.

A rear flame screen is seated on top of a rearward portion of the firebed body. The flame screen is rearwardly inclined and extends approximately 20% of the front to rear depth of the firebed body. The flame screen is provided with a plurality of cutout flame segments formed therein. The flame segments may be individual flame segments or may comprise non-continuous segments which may better represent jumping/flickering flames.

The rearward edge of the fire media bed and the forward edge of the flame screen meet at an apex ridge and together form a complete cover for the firebed body.

Inside the firebed assembly is a rotating flicker rod with a plurality of flicker elements Some embodiments may include a light shield which is positioned forward of the flicker rod. When utilized, the light shield may extends upwardly and rearwardly over the top of the flicker rod to the apex ridge junction formed between the rear edge of the fire media bed and the forward edge of the flame screen. The light shield may divide or compartmentalize the interior of the firebed into rearward and forward cavities. In some embodiments, the light shield may be solid or opaque, with or without reflective surfaces, and in other embodiments the light shield may be reflective on one or both sides thereof.

A rear LED light source (yellow-orange for example) in the rearward cavity projects light forwardly toward the flicker rod where it reflects off the rotating flicker elements rearwardly and upwardly through the flame screen to project a glowing and flickering "fire" light onto the rear firebox panel wall (rear imaging wall). As noted above, the light shield may be reflective on one or both sides and light from the rear LED light source may be reflected backwardly to enhance the flickering light exiting through the flame screen. The rear LED light may thus captured within the rear cavity and none of the forwardly projecting light reaches the fire media bed of the assembly.

Some embodiments may include a forward LED light source (multi-colored, i.e. magenta, red, blue, etc.) in the forward cavity which projects light rearwardly and upwardly onto the bottom surface of the fire media bed creating a glowing fire media bed. The front surface of the light shield may reflect the rearwardly projecting light back forwardly and upwardly to the fire media bed. The front LED light may be captured in the forward cavity and none of the rearwardly projecting light reaches the rear cavity flicker rod of the assembly.

Exemplary embodiments of the flame simulating assembly further comprise a relatively clear specular reflective panel which may be positioned anywhere within the full depth of the insert, but preferably within the rear ½ to about ⅓ of the depth, i.e. generally in the rear 3$^{rd}$ quarter of the depth. The reflective panel is reflective on both sides is supported in upright channels or notches in the side walls of the firebed base generally located at the apex junction between the rear edge of the fire media bed and the forward edge of the flame screen. The specular reflective panel is clear enough to allow the viewer to see the flame effect on the rear imaging wall, yet reflective enough to reflect the fire media bed and flame effect to increase the perceived depth of the fire media bed, thereby giving the illusion that the flames are coming out from the middle of the crystal bed and visually increasing the depth of the fire media bed.

Accordingly, in one respect, it can be seen that the present disclosure provides a unique and novel gas flame simulating concept that is highly desirable in the marketplace.

In another aspect, the present disclosure may provide a novel ready to assemble simulated fireplace insert kit which may be broken down into individual components that can more easily be packed and shipped in a flat format thus reducing shipping cost and storage space. In this regard, a simulated gas fire insert assembly comprises a front glass viewing panel, a decorative surrounding firebox panel, a heater unit, a U-shaped face frame, and a gas flame simulating assembly in accordance with the teachings herein.

BRIEF DESCRIPTION OF THE DRAWINGS

These and other features, aspects, and advantages of the present invention will become better understood with reference to the following description, appended claims, and accompanying drawings where:

DETAILED DESCRIPTION OF THE EXEMPLARY EMBODIMENTS

Figure 1:
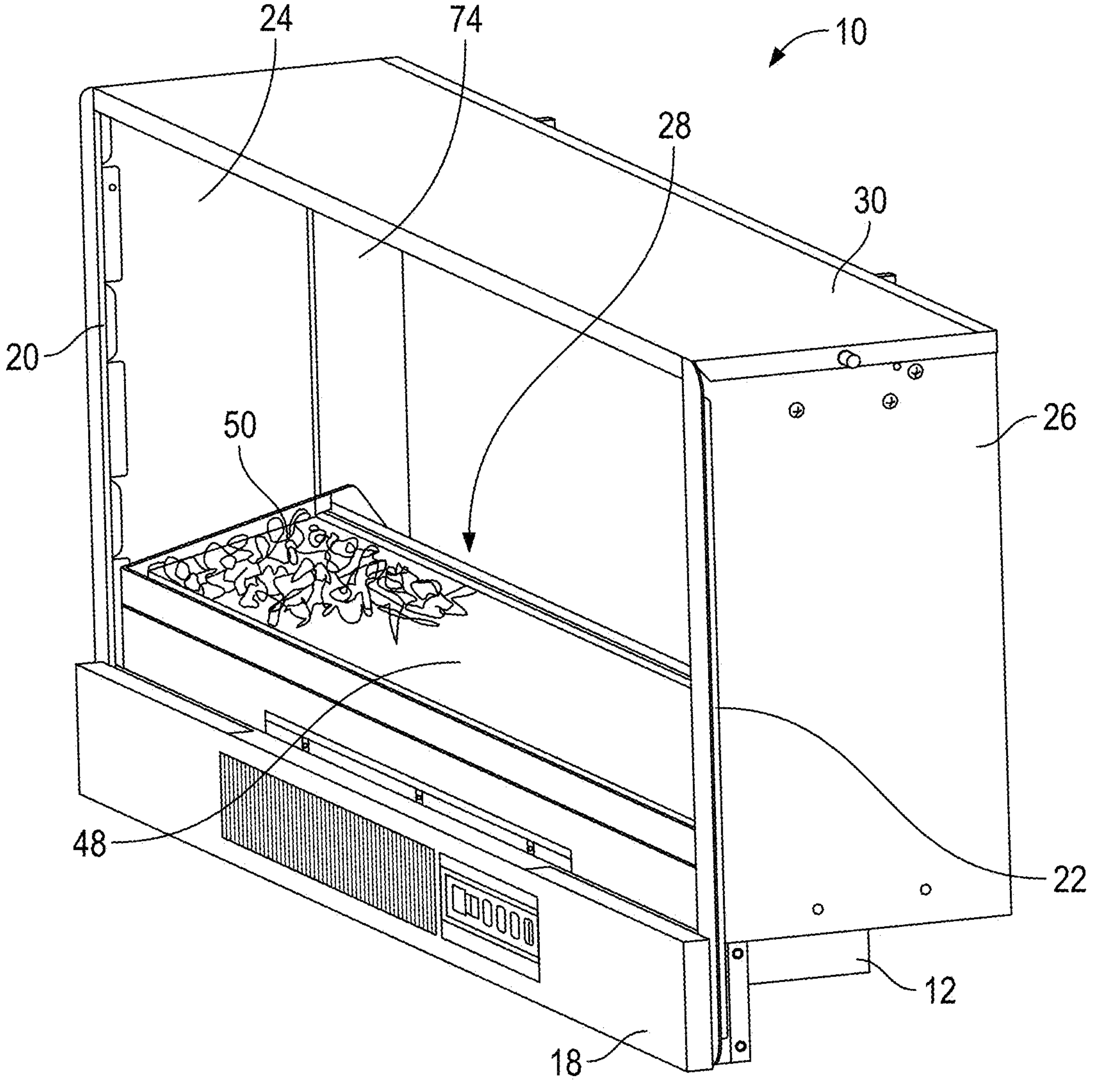
FIG. 1 is a perspective view of an exemplary crystal bed fireplace insert kit in accordance with the teachings of the present invention.

Certain exemplary embodiments will now be described to provide an overall understanding of the principles of the structure, function, manufacture, and use of the device and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present disclosure. Further, in the present disclosure, like-numbered components of the embodiments generally have similar features, and thus within a particular embodiment each feature of each like-numbered component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Further, to the extent that directional terms like top, bottom, up, or down are used, they are not intended to limit the systems, devices, and methods disclosed herein. A person skilled in the art will recognize that these terms are merely relative to the system and device being discussed and are not universal.

The present disclosure generally provides a novel flame simulating assembly comprising a fire media bed, a rear projection lighting system for flame effect on a rear imaging wall and a clear specular reflective panel which is clear enough to allow the viewer to see through it to see the flame simulation on the rear imaging wall, but also reflective enough so that it specularly reflects the fire media bed rearwardly to increase the perceived depth of the fire media bed and to at least partially reflect the flame simulation so that it appears to be emanating from the firebed.

The assembly may further comprise a forward lighting system to illuminate the underside of the fire media bed and an internal light shield which may compartmentalize the front and rear lighting systems so that the lighting colors do not bleed into one another. This unique flame simulating assembly is particularly effective for simulating gas fire and may be utilized in either fully assembled insert constructions or ready to assembly insert constructions.

Referring to FIGS. 1-13, the present disclosure provides in one respect, a novel ready to assemble simulated fireplace insert kit 10 which may be broken down into individual components that can more easily be packed and shipped in a flat format thus reducing shipping cost and storage space.

Figure 2:
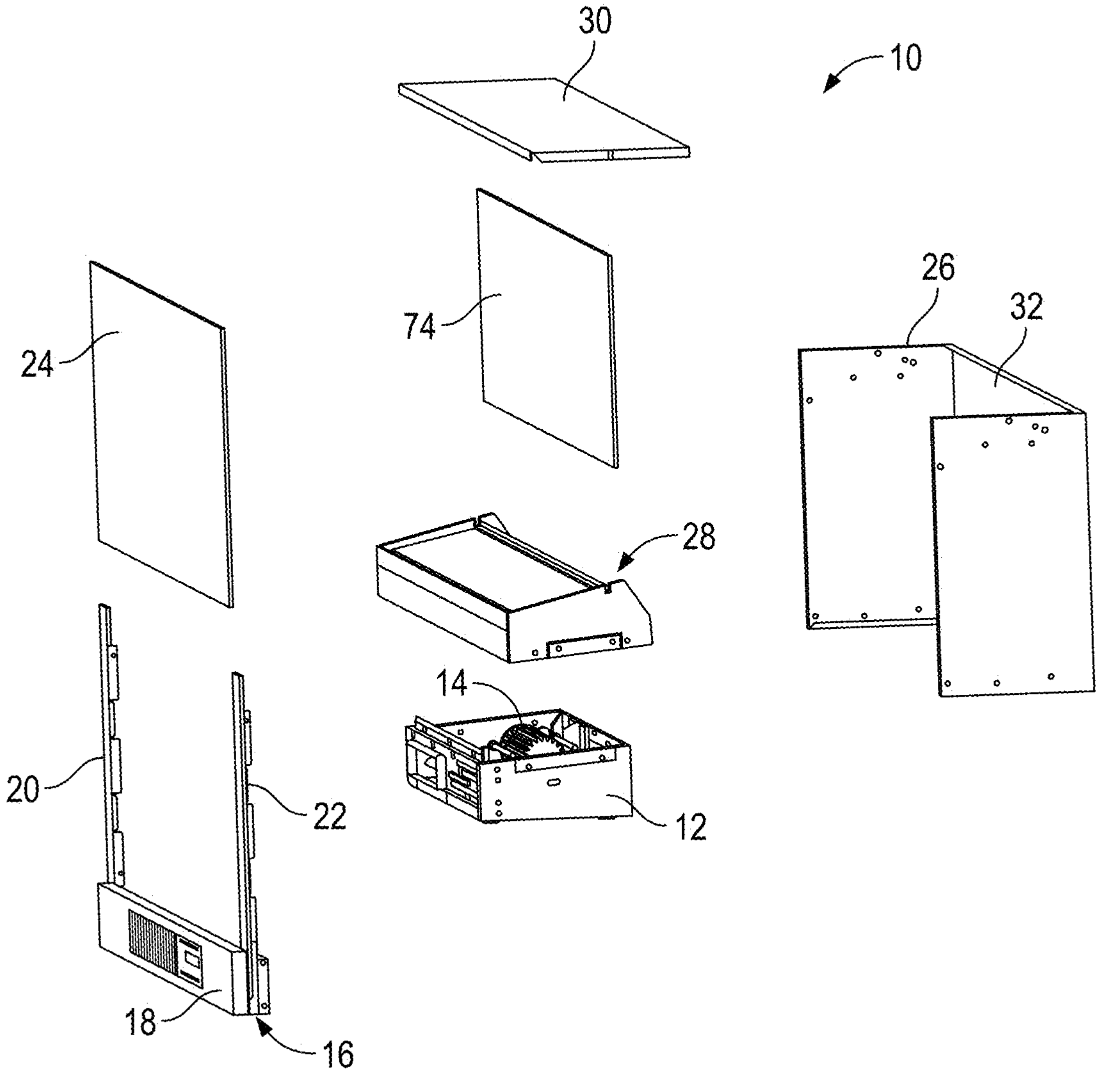
FIG. 2 is an exploded perspective view thereof.

A simulated fireplace insert assembly 10 in accordance with the teachings herein comprises a foundation 12 which may include an electric heating unit 14, a generally U-shaped face frame 16 including a grill 18 and uprights 20, 22, a front viewing panel 24, a decorative surrounding firebox panel 26 extending around the side and rear peripheral edges of the foundation, and an electronic flame simulating assembly 28 that is received on top of the foundation 12 and within a firebox cavity defined by the foundation 12 firebox panel 26 and the front viewing panel 24 (See FIGS. 1 and 2).

Some embodiments of the insert assembly 10 may further include a top cover panel 30 or other securing structure to more fully support the walls of the decorative firebox panel 26.

The front viewing panel or glass panel 24 may comprise a clear plastic such as acrylic or polycarbonate, or a tempered glass, or may in some embodiments comprise a mesh screen panel. Still further, in some embodiments, the viewing panel 24 may be excluded altogether such that the front of the assembled insert kit is open.

The decorative firebox panel 26 has a rear imaging screen portion 32 and left and right side panel portions to form the rear and sides of a decorative fireplace interior cavity (firebox). Additionally, it should be clear that the rigid panel 26 also provides structural stability to the face frame 16 and upright structural supports when the insert unit is assembled and the panel 26 is secured both to the foundation unit 12 and to the face frame upright structural supports 20, 22. As noted above, the top cover 30 also provides additional structural support.

The firebox panel 26 may comprise a rigid, planar panel substrate, such as an ⅛ inch MDF panel, and a decorative vinyl laminate surface film applied to the rigid panel substrate. The vinyl film may be printed with any of a variety of different fireplace interiors or may simply be colored black. It should be understood that other types of rigid panel materials may be used, such as metal, plastic, other wood materials, and the specific exemplary embodiments should not be considered limiting. Likewise, the decorative surface covering or film may comprise alternative materials and coverings, such as paint or other types of plastic, paper materials, films etc.

The foundation unit 12 may, or may not, include an internal heater assembly 14 depending on desired function. The foundation unit 12 may also have upwardly facing lip channels which receive the bottom peripheral edges of the firebox panel. The lip channels may be formed as part of one of the portions of the foundation housing or may be separate parts that are assembled to the housing.

The U-shaped face frame 16 comprises a lower face panel or grill plate 18 with the left and right upright structural supports 20, 22 secured thereto. The upright supports may be welded to the grill plate 18 or may be separate components and may be permanently or removably attached to the foundation 12. The front viewing panel 24 is received in assembled relation within channels or other supporting elements in the structural supports 20, 22 and/or the foundation 12.

The electronic simulated flame simulating assembly 28 in the illustrated example is configured and arranged for assembled positioning on the top surface of the foundation 12 in front of the firebox panel where it may realistically simulate a conventional gas fired fireplace. While the assembly is generally described herein as particularly suited for gas fire simulations, the structural arrangement may be equally suitable for other wood flame or mixed media flame simulating configurations.

Figure 7:
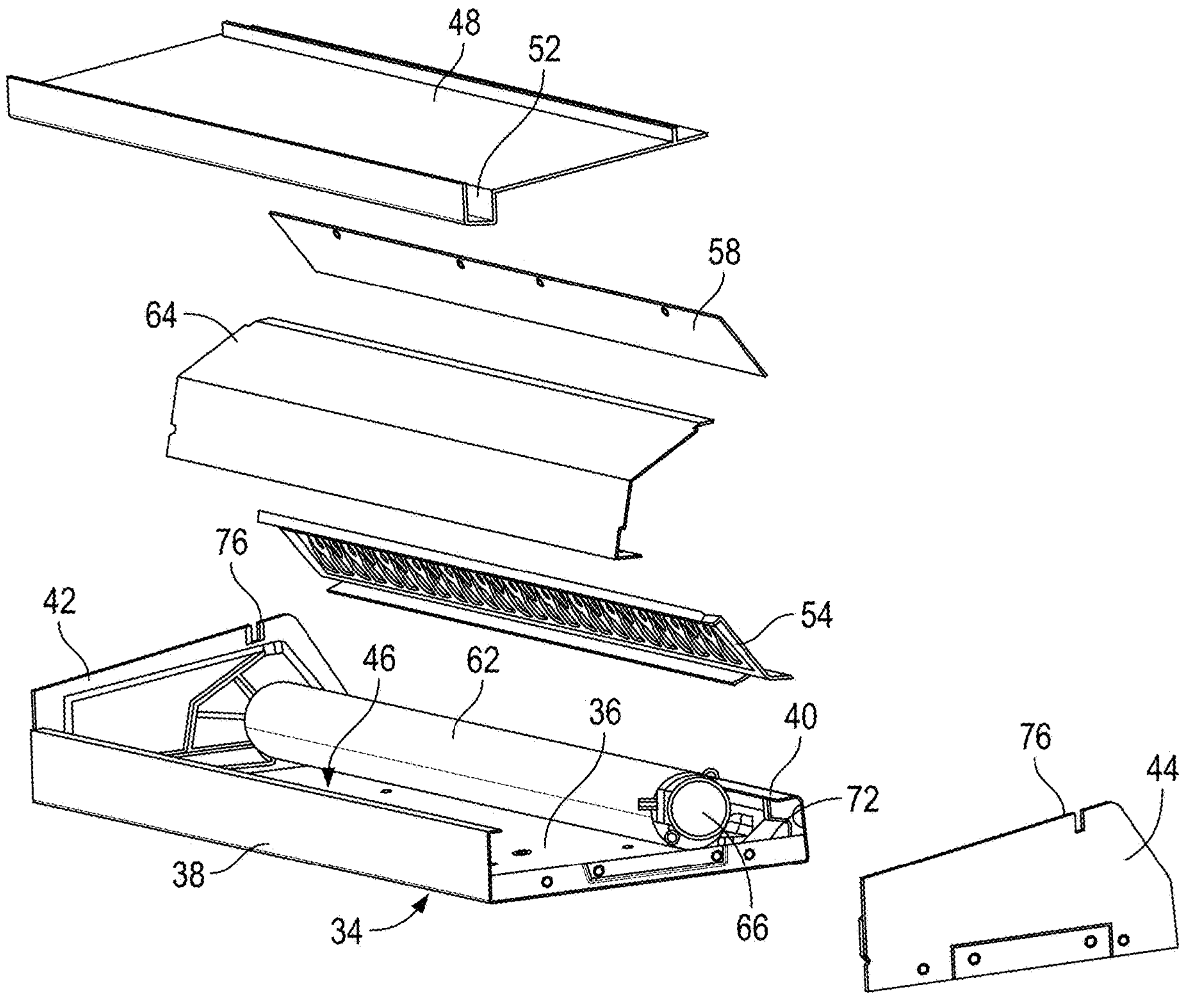
FIG. 7 is an exploded perspective view of the crystal firebed assembly.
Figure 8:
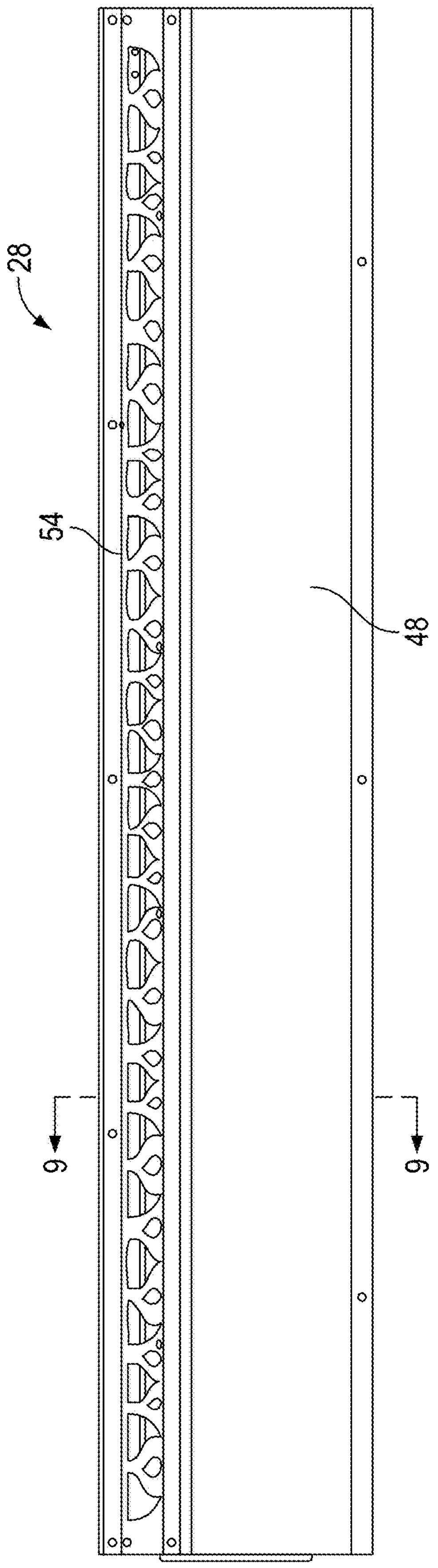
FIG. 8 is a top view thereof.
Figure 9:
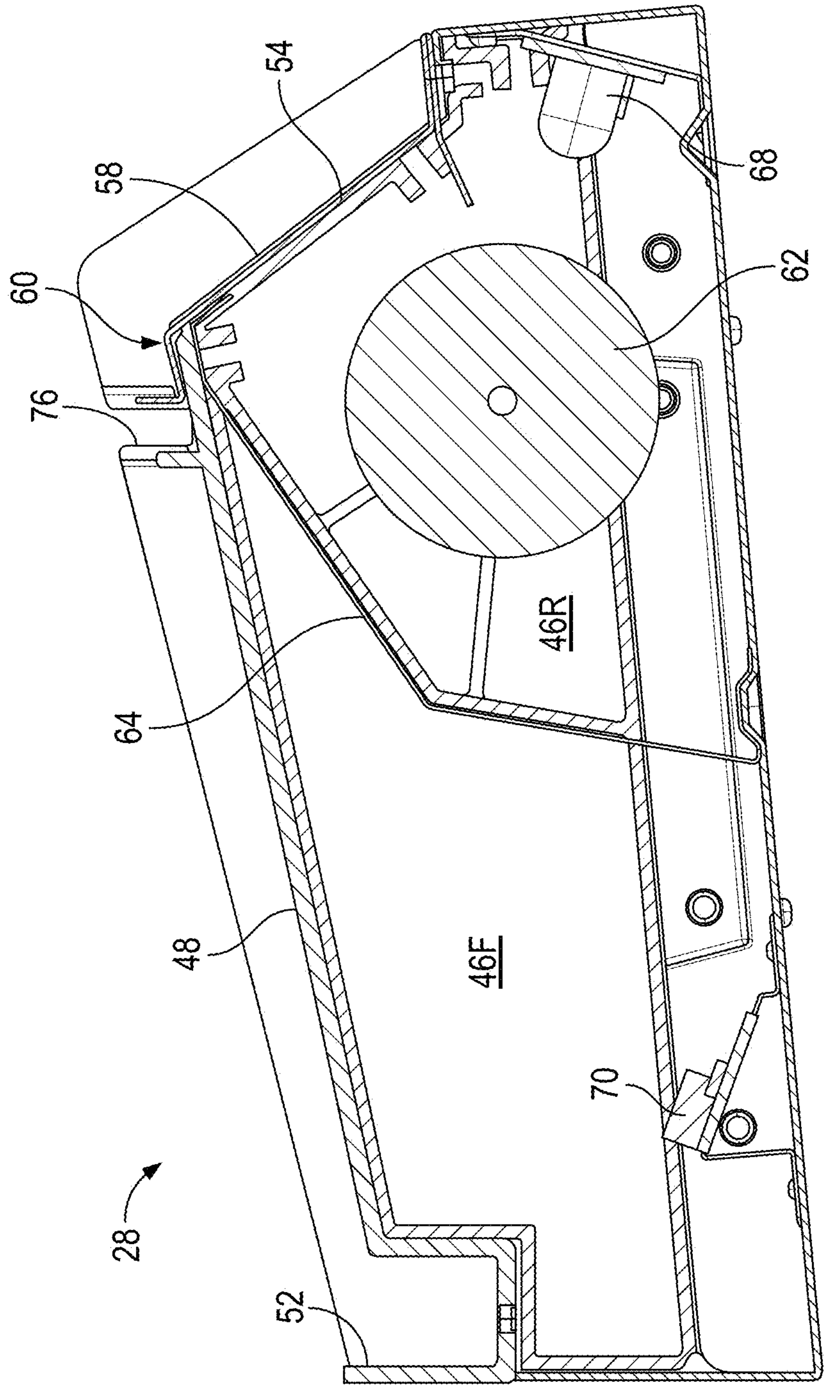
FIG. 9 is a cross-section view thereof taken along line 9-9 of FIG. 8.

Referring to FIGS. 5-10, in some embodiments, the flame simulating assembly 28 may comprise an opaque firebed body 34 having a base or lower tray 36 and upstanding front 38, rear 40 and side walls 42, 44 defining an upwardly open interior cavity 46 (See FIG. 7). The rear wall may include vents. The firebed base 36 may include alignment feet on a bottom surface which are received in alignment indents on the top surface of the foundation unit 12.

A light transmissive (transparent/translucent) fire media bed or tray 48 is seated on top of a forward portion of the firebed body 34. The fire media bed 48 may be molded or extruded from any type of clear or translucent plastic, such as for example, acrylic. The fire media bed 48 is forwardly inclined and may extend for the entirety of the front to rear depth of the firebed body, but preferably, the fire media bed 48 may extend about 60-80% of the front to rear depth. The fire media bed 48 may be filled with a fire media such crystal stones 50 (FIG. 1) or other similar gas or wood fire media, such as crushed glass or mirror shards, crushed acrylic shards, stones, pebbles, rocks, or simulated wood or driftwood. A forward edge of the fire media bed may include a trough 52 providing a front facing edge that simulates vertical depth of the bed of fire media. The fire media bed 48 may also be generally flat or horizontal in some embodiments.

A rear flame screen 54 is seated on top of a rearward portion of the firebed body. The flame screen 54 may be rearwardly inclined and may extends approximately 10-50% of the front to rear depth of the firebed body. Preferably, the flame screen 54 extends about 20% of the front to rear depth. The flame screen 54 is provided with a plurality of cutout flame segments 56 formed therein. The flame segments 56 may be individual flame segments or may comprise non-continuous segments which may better represent a jumping/flickering flame effect.

A clear protective panel 58 may be disposed over the flame screen 54 to prevent fire media 50 from falling into the interior of the cavity during assembly or movement of the unit (See FIG. 7).

The rearward edge of the fire media bed 48 and the forward edge of the flame screen 54 generally meet at an apex ridge (See FIG. 9) extending along the length of the firebed body and together form a complete cover for the firebed body.

Figure 3:
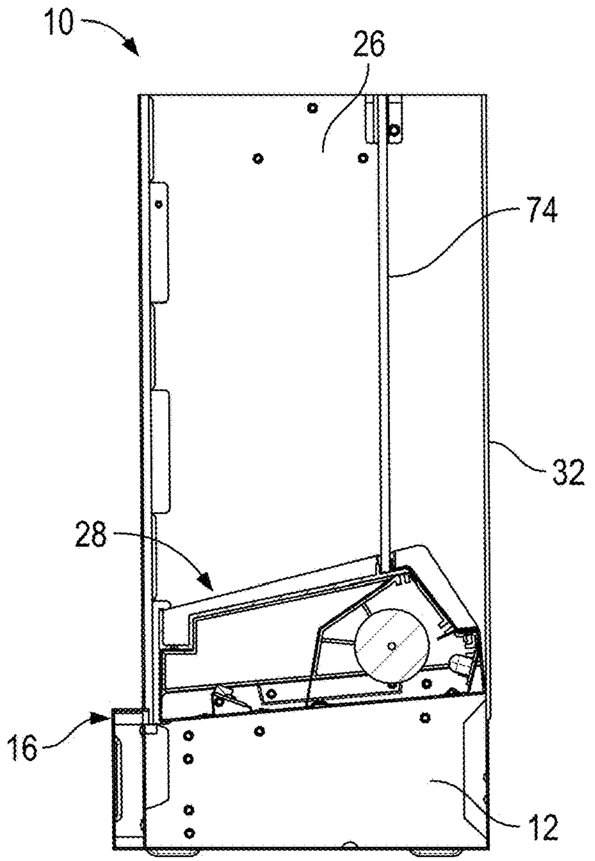
FIGS. 3-4 are cross-section views thereof showing the assembly with a clear reflective panel (FIG. 3) and without a clear reflective panel.
Figure 4:
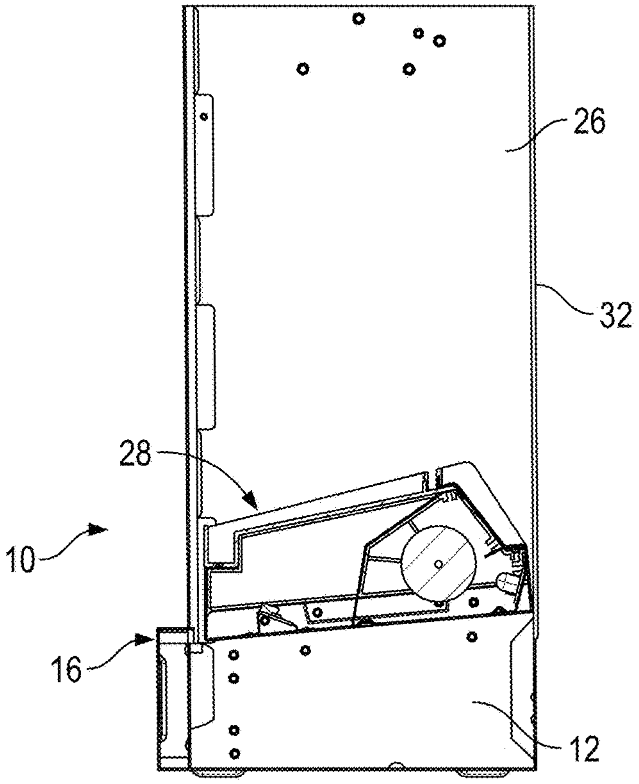
Figure 5:
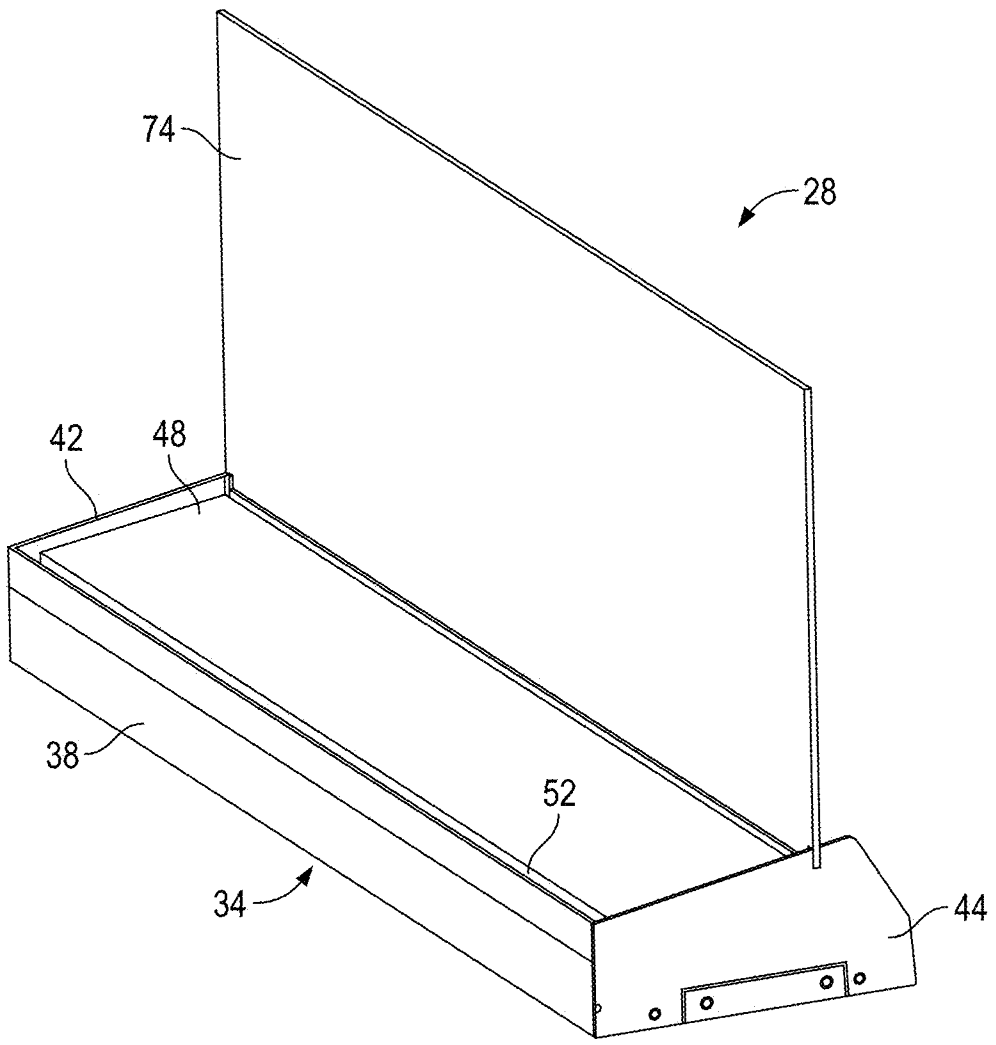
FIG. 5 is a front perspective view of the crystal firebed assembly.
Figure 6:
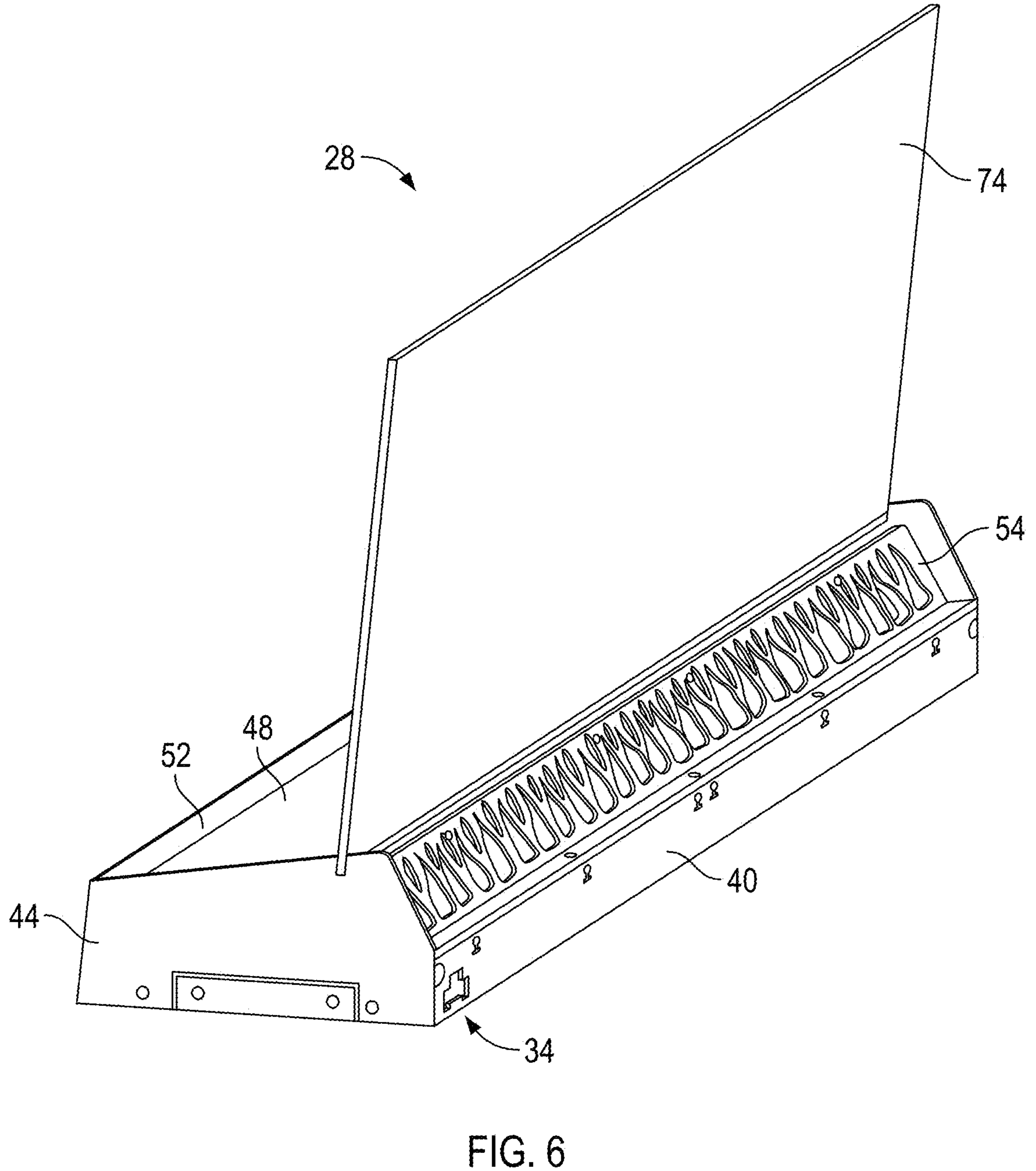
FIG. 6 is a rear perspective view of the crystal firebed assembly.

As best seen in the cross-sectional view of FIGS. 2-4, the top of the heater/foundation unit 12 may in some embodiments be angled forwardly to provide a better viewing angle for the fire media bed of the firebed assembly 28.

Referring to FIGS. 7-10A, inside the exemplary embodiment of the flame simulating assembly 28 is a rotating flicker rod 62 and a light shield 64 which is positioned forward of the flicker rod 62. The rotating flicker rod 62 may have a plurality of longitudinally and spaced radially extending flicker elements as known in the art. A motor 66 drives rotation of the flicker rod 62. The light shield 64 extends across the width of the firebed body 34, and upwardly and rearwardly over the top of the flicker rod 62 to the apex junction 60 formed between the rear edge of the fire media bed 48 and the forward edge of the flame screen 54. In this configuration, the light shield 64 divides or compartmentalizes the interior of the firebed into a rearward cavity 46R and a forward cavity 46F (See FIGS. 10-11). In some embodiments, the light shield 64 may be solid or opaque, with or without reflective surfaces, and in other embodiments, the light shield may be reflective on one or both surfaces.

A rear LED light source 68 (yellow-orange for example) in the rearward cavity 46R projects light (arrows RL in FIG. 10) forwardly toward the flicker rod 62 where the light RL reflects off the rotating flicker elements rearwardly and upwardly through the flame screen 54 to project a glowing and flickering flame effect onto the rear firebox panel wall (imaging screen wall 32). As noted above, the light shield 64 may be reflective on one or both sides where light from the rear LED light source 68 may be reflected backwardly to enhance the flickering light exiting through the flame screen 54. The rear LED light RL is captured within the rear cavity 46R does not reach the forward cavity 46F beneath the fire media bed of the assembly.

A forward LED light source 70 (single color or selectively multi-colored, i.e. magenta, red, blue, etc., for example) in the forward cavity 46F projects light (arrows FL in FIG. 10) rearwardly and upwardly onto the bottom surface of the fire media bed 48 creating a glowing fire media bed. The front surface of the light shield 64 may reflect the rearwardly projecting light FL back forwardly and upwardly to the fire media bed 48. The front LED light FL is captured in the forward cavity 46F and does not reach the rear cavity 46R and flicker rod of the assembly.

Electronic functionality of the motor 66, flicker rod 62 and LED light sources 68, 70 is controlled by conventional LED driver electronics and motor controller 72 (See FIG. 7).

While LED light sources 68, 70 have been described as preferred embodiments, conventional incandescent, halogen or other suitable light sources with appropriately colored filter elements may also be considered as equivalent.

Referring to FIGS. 2-6, 10 and 10A, the flame simulating assembly may further comprise a relatively clear specular reflective panel 74 which may be positioned anywhere within the full depth of the insert, but preferably about ½ to about ¼ of the depth, i.e. generally in the rear $3^{rd}$ quarter of the depth. The relatively clear specular reflective panel 74 may be glass or other clear plastic material, and may also be referred to in the industry as "clear reflective glass", "transparent specular reflective glass", "dichroic glass", "dichroic mirror glass", "double side plated mirror glass" and/or "multilayered glass". The function of the specular reflective panel 74 is to be clear enough to allow the viewer to see through the panel to see the flame simulation effect on the rear imaging wall, but also reflective enough to specularly reflect the fire media bed in the front enough to increase the perceived depth of the fire media bed behind the panel 74 and allow the flame effect to appear to arise through the middle of the reflected media bed. The panel 74 is reflective on both sides and does not have a diffusion screen or diffusion coating on its rear surface as many prior art concepts may have.

The reflective panel 74 is supported in upright channels or notches 76 in the side walls 42, 44 of the firebed base (See FIGS. 3, 6 and 9) generally located at the apex junction between the rear edge of the fire media bed and the forward edge of the flame screen. As noted above, the specular reflective panel 74 provides the illusion of the flames coming out from the rear and middle of the fire media bed 48 and visually increases the perceived depth of the fire media bed 48.

Figure 10:
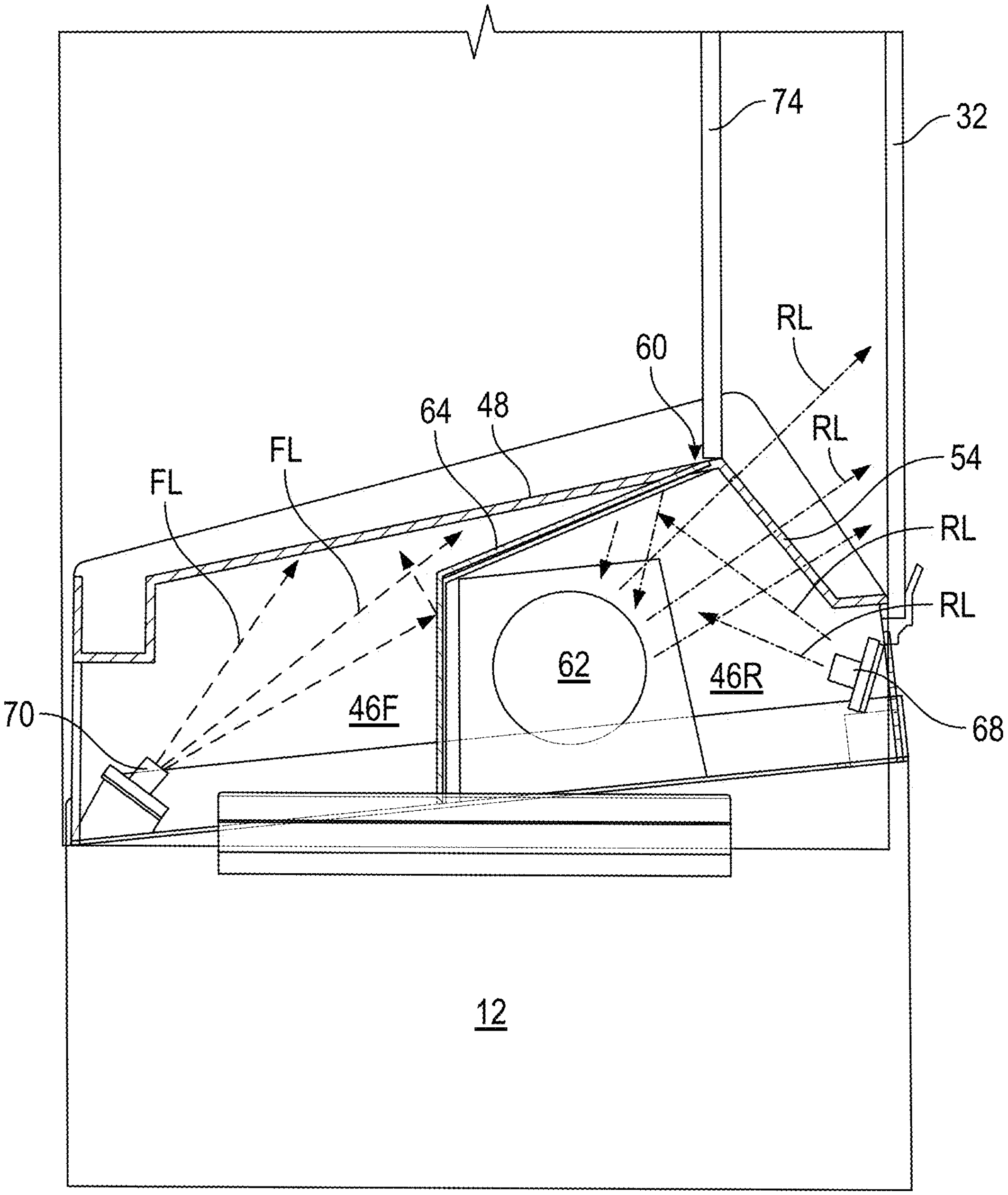
FIG. 10 is a cross-section illustration showing the light paths from the rearward and forward light sources and showing positioning of the clear reflective panel at the apex junction between the front crystal bed and the rear flame screen.
Figure 10A:
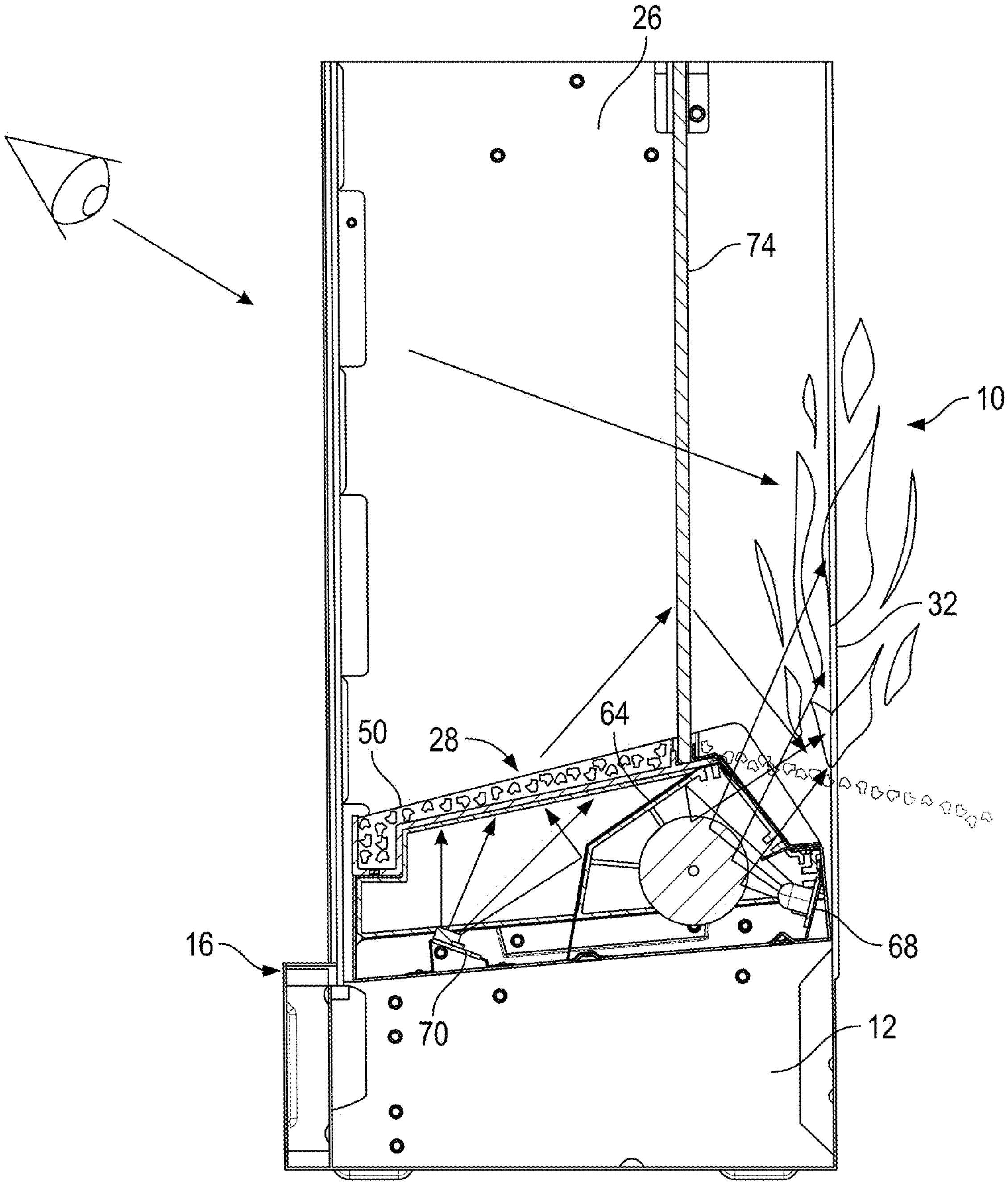
FIG. 10A is an enlarged cross-sectional view similar to FIG. 3 illustrating the various light paths from the front and rear light sources, as well as the users view through the clear reflective panel and the perceived increase in depth of the fire bed media created by specular reflection of the panel.

FIGS. 3 and 4 are cross-sectional views of the insert assembly 10, showing the assembly with a clear reflective panel 74 (FIG. 3) and without a clear reflective panel (FIG. 4). FIG. 10A is an enlarged cross-sectional view similar to FIG. 3 illustrating the various light paths from the front and rear light sources, as well as the users view through the clear reflective panel 74 and the perceived increase in depth of the fire bed media 50 created by specular reflection of the panel 74.

Figure 10B:
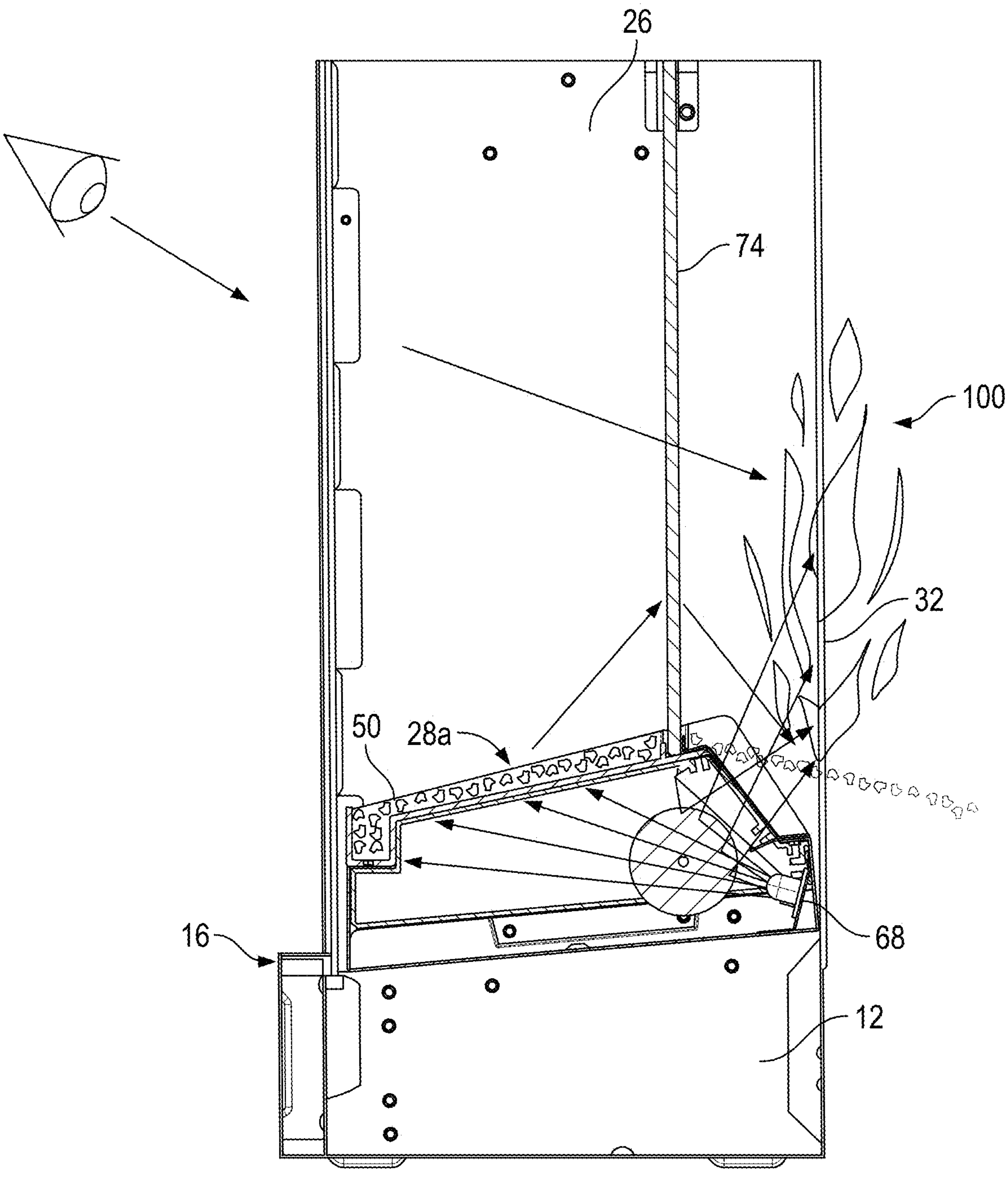
FIG. 10B is another enlarged cross-sectional view of an alternate embodiment which does not include the front light source or the internal light shield, illustrating the light paths only from the rear light source, as well as the users view through the clear reflective panel and the perceived increase in depth of the fire bed media created by specular reflection of the panel.
Figure 11:
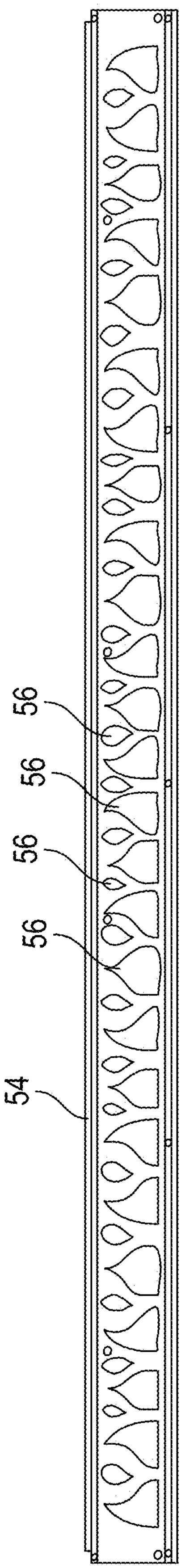
FIG. 11 is a plan view of the flame segment pattern on the flame screen.

Referring to FIG. 10B, an alternative embodiment of the assembly is indicated at 100. In this regard, a flame simulating assembly 28A includes all other above-described features but excludes the front light source and the internal light shield. Light from the rear light source 68 projects light forwardly toward the flicker rod 62 where the light reflects off the rotating flicker elements rearwardly and upwardly through the flame screen 54 to project a glowing and flickering flame effect onto the rear firebox panel wall (imaging screen wall 32). Without the light shield 64, the forwardly projected light passes through and around the flicker rod 62 to also illuminate the fire media bed 48 of the assembly. This configuration may allow shallower assembly constructions with similar visual effect and lower costs.

Figure 12:
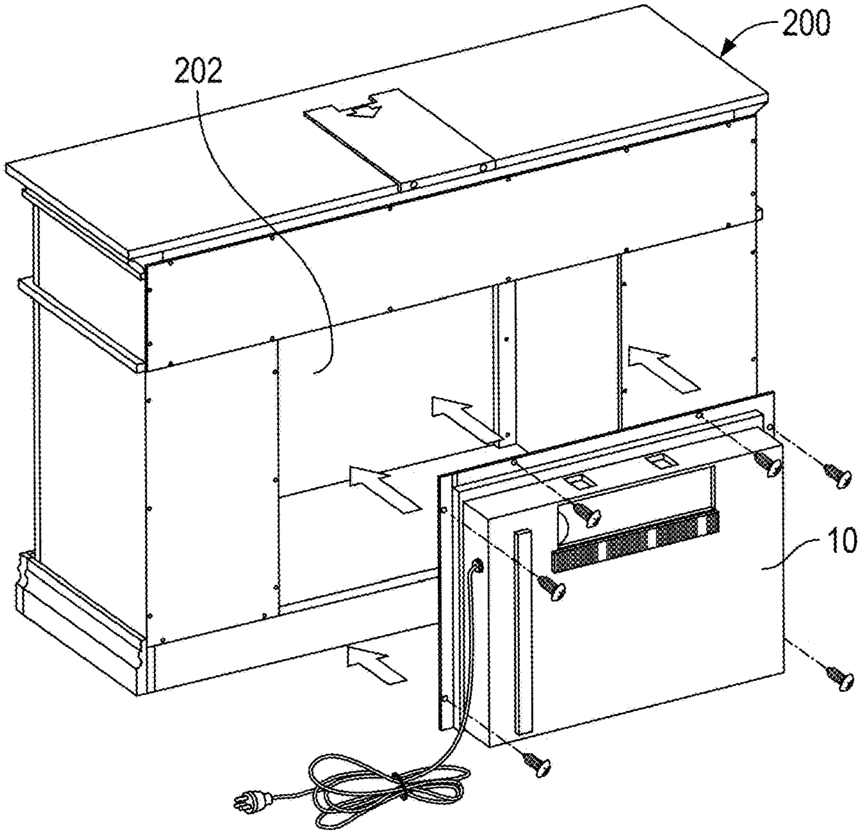
FIG. 12 is a rear view of a furniture console showing insertion of the crystal bed fireplace insert into an insert cavity in the furniture console.
Figure 13:
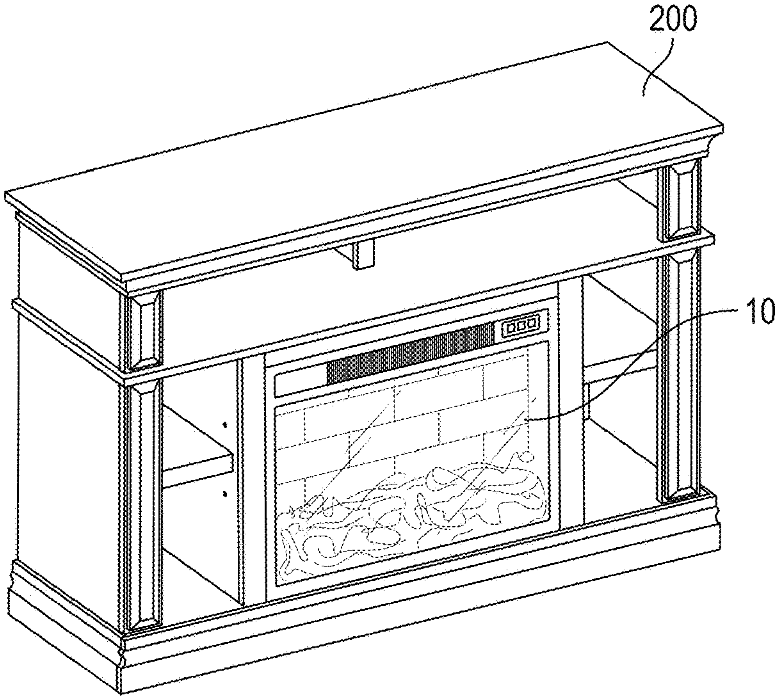
FIG. 13 is a front view thereof illustrating a completed furniture console and insert assembly thereof.

Turning to FIGS. 12-13, the herein described insert assembly 10 may be received and assembled with a separate independent furniture piece 100. The furniture piece 100 may comprise a furniture base having an upper surface, a furniture top having a lower surface, left and right furniture sides extending between the upper surface of the furniture base and the lower surface of the top and structurally supporting the top above the base when assembled therewith to form an insert cavity 102 within the furniture assembly, and wherein the assembled simulated fireplace kit 10 is slidably received into the insert cavity 102 in the furniture piece 100.

The unique flame simulating assembly 28 may be effectively utilized in any type of fireplace insert, pre-assembled or ready to assemble, to provide an improved wood or gas fire simulation.

While a particular exemplary embodiment of a ready to assemble furniture piece/console kit 200 is illustrated herein, the teachings of the present invention are equally applicable to any other furniture console and piece which generally provides a firebox cavity capable of receiving such a fireplace insert or any fireplace insert kit as to be described herein. Such consoles or pieces may include, but are not limited to, mantles, shelving units desks, buffets, media cabinets, etc. and may in some embodiments include shelves, doors, etc. as common with various furniture pieces.

Likewise, the furniture console or piece 200 may also comprise in some embodiments any type of assembled or finished furniture piece having a firebox cavity or opening 202 capable of receiving the ready to assemble fireplace insert 10 as described herein.

Accordingly, among the objectives of the invention are:

The provision of a flame simulating assembly for a simulated fireplace insert comprising:

a firebed body having an upwardly open interior cavity;

a light transmissive fire media bed seated on top of a forward portion the firebed body;

a flame screen seated on top of a rearward portion of the firebed body, the flame screen having a plurality of cutout flame segments formed therein; a rotating flicker rod disposed within the interior cavity of the firebed body;

an opaque light shield extending along a length of the interior cavity, the light shield being positioned forward of the flicker rod and extending upwardly and rearwardly over the top of the flicker rod whereby the light shield divides the interior cavity of the firebed body into rearward and forward cavities;

a rear light source disposed within the rearward cavity, wherein the rear light source projects light forwardly toward the flicker rod and wherein said light reflects off the rotating flicker elements rearwardly and upwardly through the flame screen to project a glowing and flickering flame effect, the light shield preventing light from the rear light source from entering the forward cavity;

a forward light source disposed within the forward cavity, wherein the forward light source projects light rearwardly and upwardly onto the bottom surface of the fire media bed to create a glowing fire media bed, the light shield preventing light from the forward light source entering the rearward cavity; and a relatively clear specular reflective panel extending upward from the firebed body and positioned with the depth of the firebed body.

The provision of a flame simulating assembly wherein a rearward edge of the fire media bed and the forward edge of the flame screen meet at an apex ridge and together form a complete cover for the firebed body.

The provision of a flame simulating assembly wherein the fire media bed is forwardly inclined and the flame screen is rearward inclined.

The provision of a flame simulating assembly, wherein the fire media bed extends approximately 60-80% of a front to rear depth of the firebed body and the flame screen extends approximately 20-40% of the front to rear depth of the firebed body.

The provision of a flame simulating assembly wherein the light shield has front and rear surfaces, and wherein one or both of the front and rear surface are reflective.

The provision of a flame simulating assembly, wherein the fire media bed and extends approximately 80% of a front to rear depth of the firebed body and the flame screen extends approximately 20% of the front to rear depth of the firebed body.

The provision of a flame simulating assembly wherein the fire media bed is filled with a fire media selected from the group consisting of: crystals, glass shards, mirror shards, plastic shards, stones, rocks, pebbles, simulated wood, and combinations thereof.

The provision of a simulated fireplace insert comprising:

a foundation;

a face-frame at the front of the foundation;

a clear viewing panel within the face frame;

a decorative firebox panel extending around the outer peripheral side and rear edges of the foundation, said decorative firebox panel including a rear imaging wall; and a flame simulating assembly seated on the foundation comprising: a firebed body having an upwardly open interior cavity;

a light transmissive fire media bed seated on top of a forward portion the firebed body;

a flame screen seated on top of a rearward portion of the firebed body, the flame screen having a plurality of cutout flame segments formed therein;

a rotating flicker rod disposed within the interior cavity of the firebed body;

an opaque light shield extending along a length of the interior cavity, the light shield being positioned forward of the flicker rod and extending upwardly and rearwardly over the top of the flicker rod whereby the light shield divides the interior cavity of the firebed body into rearward and forward cavities;

a rear light source disposed within the rearward cavity, wherein the rear light source projects light forwardly toward the flicker rod and wherein said light reflects off the rotating flicker elements rearwardly and upwardly through the flame screen to project a glowing and flickering light onto the rear imaging wall, the light shield preventing light from the rear light source from entering the forward cavity;

a forward light source disposed within the forward cavity, wherein the forward light source projects light rearwardly and upwardly onto the bottom surface of the crystal bed to create a glowing crystal bed, the light shield preventing light from the forward light source entering the rearward cavity; and a relatively clear specular reflective panel extending upward from the firebed body and positioned within the depth of the firebed body.

The provision of a flame simulating assembly for a simulated fireplace insert comprising:

a firebed body having an upwardly open interior cavity;

a light transmissive fire media bed seated on top of a forward portion the firebed body;

a flame screen seated on top of a rearward portion of the firebed body, the flame screen having a plurality of cutout flame segments formed therein;

a rotating flicker rod disposed within the interior cavity of the firebed body;

a rear light source disposed within the rearward cavity, wherein the rear light source projects light forwardly toward the flicker rod and wherein said light reflects off the rotating flicker elements rearwardly and upwardly through the flame screen to project a glowing and flickering flame effect, and further projects light forwardly and upwardly onto the bottom surface of the fire media bed to create a glowing fire media bed; and a relatively clear specular reflective panel extending upward from the firebed body and positioned with the depth of the firebed body.

Accordingly, it can be seen that the present disclosure provides a unique and novel flame simulating concept that is highly desirable in the marketplace.

What is claimed is:

1. A flame simulating assembly for a simulated fireplace insert comprising:

a firebed body having an upwardly open interior cavity;

a light transmissive fire media bed seated on top of a forward portion the firebed body, said light transmissive fire media bed having a bottom surface;

a flame screen seated on top of a rearward portion of the firebed body, the flame screen having a plurality of cutout flame segments formed therein;

a rotating flicker rod disposed within the interior cavity of the firebed body;

a rear light source disposed within the interior cavity, wherein the rear light source projects light forwardly toward the flicker rod and wherein said light reflects off the rotating flicker elements rearwardly and upwardly through the flame screen to project a glowing and flickering flame effect, and further projects light forwardly and upwardly onto the bottom surface of the light transmissive fire media bed to create a glowing fire media bed; and a specular reflective panel extending upward from the firebed body and positioned within the depth of the firebed body.

2. The flame simulating assembly of claim 1, wherein a rearward edge of the fire media bed and the forward edge of the flame screen meet at an apex ridge and together form a complete cover for the firebed body.

3. The flame simulating assembly of claim 1, wherein the fire media bed is forwardly inclined and the flame screen is rearward inclined.

4. The flame simulating assembly of claim 2, wherein the fire media bed is forwardly inclined and the flame screen is rearward inclined.

5. The flame simulating assembly of claim 1 further comprising a fire media received on the fire media bed, said fire media being selected from the group consisting of: crushed glass shards, crushed mirror shards, crushed acrylic shards, crystals, stones, rocks, pebbles, simulated wood, and combinations thereof.

6. A flame simulating assembly for a simulated fireplace insert comprising:

- a firebed body having an upwardly open interior cavity;
- a light transmissive fire media bed seated on top of a forward portion the firebed body, said light transmissive fire media bed having a bottom surface;
- a flame screen seated on top of a rearward portion of the firebed body, the flame screen having a plurality of cutout flame segments formed therein;
- a rotating flicker rod disposed within the interior cavity of the firebed body;
- an opaque light shield extending along a length of the interior cavity, the light shield being positioned forward of the flicker rod and extending upwardly and rearwardly over the top of the flicker rod whereby the light shield divides the interior cavity of the firebed body into rearward and forward cavities;
- a rear light source disposed within the rearward cavity, wherein the rear light source projects light forwardly toward the flicker rod and wherein said light reflects off the rotating flicker elements rearwardly and upwardly through the flame screen to project a glowing and flickering flame effect, the light shield preventing light from the rear light source from entering the forward cavity;
- a forward light source disposed within the forward cavity, wherein the forward light source projects light rearwardly and upwardly onto the bottom surface of the light transmissive fire media bed to create a glowing fire media bed, the light shield preventing light from the forward light source entering the rearward cavity; and
- a specular reflective panel extending upward from the firebed body and positioned within the depth of the firebed body.

7. The flame simulating assembly of claim 6, wherein a rearward edge of the fire media bed and the forward edge of the flame screen meet at an apex ridge and together form a complete cover for the firebed body.

8. The flame simulating assembly of claim 6, wherein the fire media bed is forwardly inclined and the flame screen is rearward inclined.

9. The flame simulating assembly of claim 7, wherein the fire media bed is forwardly inclined and the flame screen is rearward inclined.

10. The flame simulating assembly of claim 7, wherein the fire media bed extends approximately 60-80% of a front to rear depth of the firebed body and the flame screen extends approximately 20-40% of the front to rear depth of the firebed body.

11. The flame simulating assembly of claim 9, wherein the fire media bed extends approximately 60-80% of a front to rear depth of the firebed body and the flame screen extends approximately 20-40% of the front to rear depth of the firebed body.

12. The flame simulating assembly of claim 6 wherein the light shield has front and rear surfaces, and wherein one or both of said front and rear surface are reflective.

13. The flame simulating assembly of claim 6 wherein the fire media bed is filled with a fire media selected from the group consisting of: crushed glass shards, crushed mirror shards, crushed acrylic shards, crystals, stones, rocks, pebbles, simulated wood, and combinations thereof.

14. A simulated fireplace insert comprising:

- a foundation;
- a face-frame at a front of the foundation;
- a clear viewing panel within the face-frame;
- a decorative firebox panel extending around outer peripheral side and rear edges of the foundation, said decorative firebox panel including a rear imaging wall; and
- a flame simulating assembly seated on the foundation comprising:
  - a firebed body having an upwardly open interior cavity;
  - a light transmissive fire media bed seated on top of a forward portion the firebed body, said light transmissive fire media bed having a bottom surface;
  - a flame screen seated on top of a rearward portion of the firebed body, the flame screen having a plurality of cutout flame segments formed therein;
  - a rotating flicker rod disposed within the interior cavity of the firebed body;
  - an opaque light shield extending along a length of the interior cavity, the light shield being positioned forward of the flicker rod and extending upwardly and rearwardly over the top of the flicker rod whereby the light shield divides the interior cavity of the firebed body into rearward and forward cavities;
  - a rear light source disposed within the rearward cavity, wherein the rear light source projects light forwardly toward the flicker rod and wherein said light reflects off the rotating flicker elements rearwardly and upwardly through the flame screen to project a glowing and flickering flame effect onto the rear imaging wall, the light shield preventing light from the rear light source from entering the forward cavity;
  - a forward light source disposed within the forward cavity, wherein the forward light source projects light rearwardly and upwardly onto the bottom surface of the light transmissive fire media bed to create a glowing fire media bed, the light shield preventing light from the forward light source entering the rearward cavity; and
- a specular reflective panel extending upward from the firebed body and positioned within the depth of the firebed body.

15. The simulated fireplace insert of claim 14, wherein a rearward edge of the fire media bed and the forward edge of the flame screen meet at an apex ridge and together form a complete cover for the firebed body.

16. The simulated fireplace insert of claim 14, wherein the fire media bed is forwardly inclined and the flame screen is rearward inclined.

17. The simulated fireplace insert of claim 14, wherein the fire media bed extends approximately 60-80% of a front to rear depth of the firebed body and the flame screen extends approximately 20-40% of the front to rear depth of the firebed body.

18. The simulated fireplace insert of claim 16, wherein the fire media bed extends approximately 60-80% of a front to rear depth of the firebed body and the flame screen extends approximately 20-40% of the front to rear depth of the firebed body.

19. The flame simulating assembly of claim 14 wherein the fire media bed is filled with a fire media selected from the group consisting of crushed glass shards, crushed mirror shards, crushed acrylic shards, crystals, stones, rocks, pebbles, simulated wood, and combinations thereof.

* * * * *